Nov. 6, 1928.
L. C. LLOYD
1,690,645
PROTRACTOR
Filed Sept. 29, 1927
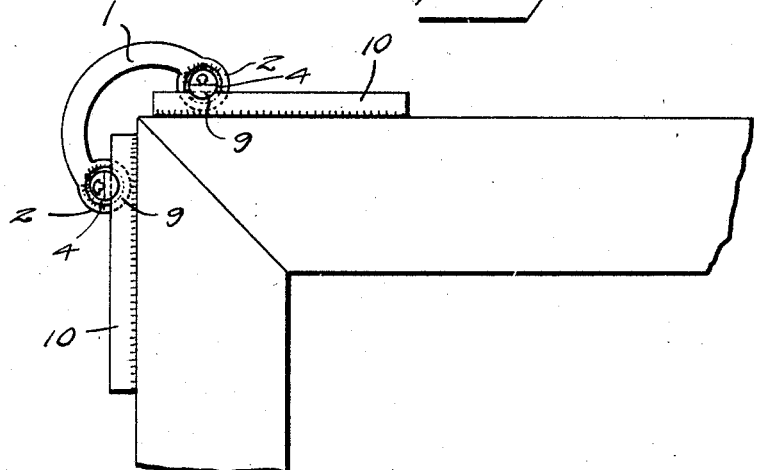
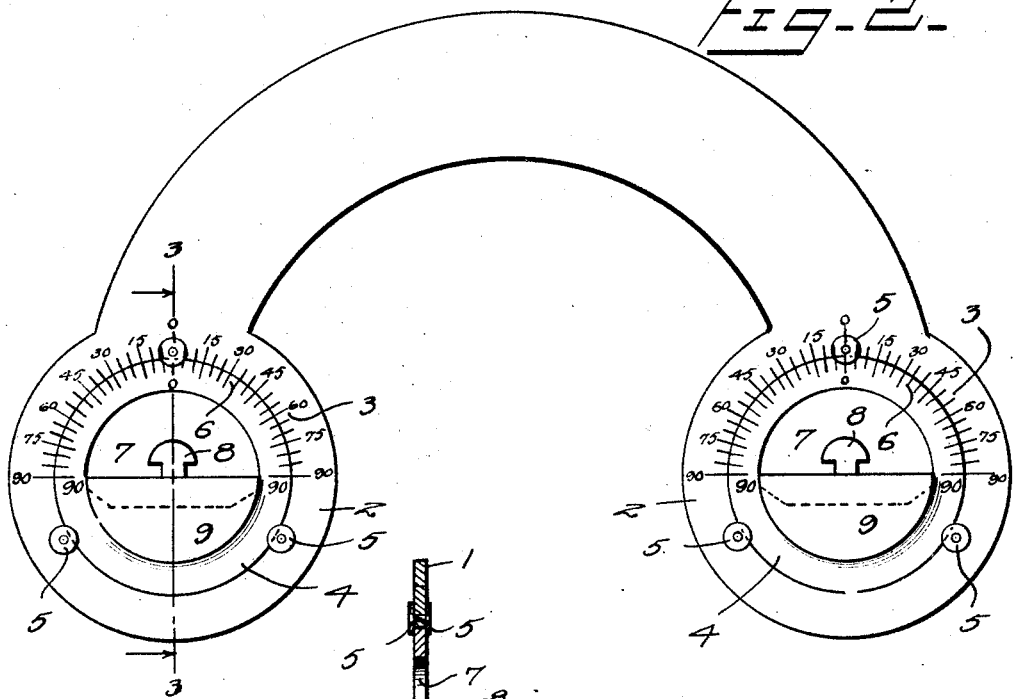
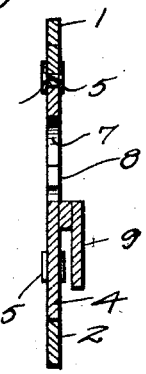
Inventor
L. C. Lloyd
By Watson E. Coleman
Attorney Patented Nov. 6, 1928.

1,690,645

UNITED STATES PATENT OFFICE.

LEWIS C. LLOYD, OF WILMINGTON, CALIFORNIA.

PROTRACTOR.

Application filed September 29, 1927. Serial No. 222,839.

This invention relates to a protractor especially adapted for use by welders and mechanics in general for connecting pieces or parts together at desired angles and it consists in the novel features hereinafter described and claimed.

An object of the invention is to provide a protractor consisting of an arcuate arm adapted to bridge the weld or joint and carrying rule sections adapted to be applied to the edges of the pieces in order to ascertain if the said edges are properly located with relation to each other, so that the pieces may be disposed at a desired angle with relation to each other.

In the accompanying drawing:—

Figure 1 is a side elevational view of the protractor showing the same applied;

Figure 2 is an enlarged plan view of the protractor;

Figure 3 is a detail sectional view cut on the line 3—3 of Figure 2.

The protractor consists of an arcuate arm 1 provided at its ends with rings 2. The openings in the rings are provided along one-half of their edges with calibrations. Disks 4 are snugly received in the openings of the ring 2 and are held therein by means of guides 5 attached to the rings and having edge portions which overlap the edges of the disks. The disks are provided along their peripheries with calibrations 6 adapted to be moved along the series of calibrations 3.

The disks are provided at their centers with openings 7 having studs 8 disposed therein and the said studs may be used as finger notches for turning the disks within the rings. The disks 4 are provided at their outer faces with bracket lugs 9 which are adapted to receive rule sections 10. The said rule sections have straight edges and when they are received in the bracket arms, the said straight edges may be applied to the edges of the pieces of material which are to be joined, so that the weld may occur at the inner ends of the rule sections. By reason of this arrangement, the disks may be turned within the rings, so that the rule sections may be disposed at desired angles with relation to each other and consequently, when the edges of the rule sections are applied to the edges of pieces of material, the said pieces are disposed at a desired angle with relation to each other and may be readily joined together by a weld joint.

Since the construction hereinbefore set forth is capable of a certain range of change and modification without materially departing from the spirit of the invention, I do not limit myself to such specific structure except as hereinafter claimed.

I claim:—

1. A protractor comprising an arcuate arm provided at its ends with rings, disks mounted for turning movement within the rings, rule sections and bracket lugs mounted upon the disks and adapted to retain said rule sections.

2. A protractor comprising an arcuate arm provided at its ends with rings, the openings in the rings having calibrations disposed along their edges, disks mounted for turning movement in the rings and provided at their edges with calibrations and rule sections, said disks having bracket arms adapted to receive said rule sections.

3. A protractor comprising rule sections, an arcuate arm provided at its end with rings, guide members located at the sides of the rings, disks turnably mounted in the rings, the rings and disks having coacting calibrations, said disks having openings, studs carried by said disks and projecting into the openings thereof and bracket lugs secured to the disk for the reception of said rule sections.

In testimony whereof I hereunto affix my signature.

LEWIS C. LLOYD.